2,866,116
Patented Dec. 23, 1958

2,866,116

ELECTROLUMINESCENT MATERIAL

Peter Whitten Ranby, London, England, assignor to Thorn Electrical Industries Limited, London, England, a British company No Drawing. Application October 18, 1954
Serial No. 463,037

12 Claims. (Cl. 313—108)

This invention relates to electroluminescent materials which are excited to luminescence by an electric field, to methods of making such materials and to lamps incorporating such materials.

According to this invention, an artificial electroluminescent material comprises zinc sulphide activated by copper and lead, the material including from 0.002 to 0.5% of combined chlorine, by weight of the zinc sulphide, and from 0.2 to 5% of potassium, by weight of the zinc sulphide, in the form of a compound of potassium other than one comprising combined halogen.

Also according to this invention, a method of making an artificial electroluminescent material includes the steps of preparing an intimate mixture and heating it to form the material, the intimate mixture comprising zinc sulphide, a copper compound and a lead compound such that after heating or reheating the intimate mixture they will be at least partly incorporated in the final material as activators, from 0.002 to 0.5% of combined chlorine, by weight of the zinc sulphide, and from 0.2 to 5% of potassium, by weight of the zinc sulphide, in the form of a compound of potassium other than one comprising combined halogen.

Further according to this invention, an electroluminescent lamp comprises a pair of spaced conductive electrodes and an electroluminescent material disposed between the electrodes to be traversed by an electric field produced between the electrodes, the material comprising zinc sulphide activated by copper and lead and including from 0.002 to 0.5% of combined chlorine, by weight of the zinc sulphide, and from 0.2 to 5% of potassium, by weight of the zinc sulphide, in the form of a compound of potassium other than one comprising combined halogen.

Preferably, the electroluminescent material comprises about 1% of potassium, by weight of the zinc sulphide. The amount of copper present in the material or the intimate material in the form of a compound thereof may be from 0.01 to 0.15%, by weight of zinc sulphide, and preferably is from 0.014 to 0.04% by weight. The amount of lead present in the form of a compound thereof may be from 0.02 to 2% by weight of the zinc sulphide and preferably is from 0.15 to 1.5% by weight.

Zinc sulphide activated with copper and lead and including less than about 0.2% of combined chlorine, by weight of the zinc sulphide, exhibits a blue electroluminescence upon excitation by an electric field. I have found that the addition of potassium results in a material from which the electroluminescent radiation contains less green light and the material therefore appears to give a better and brighter blue light. I have also found that with potassium in the material the proportion of combined chlorine which may be included in the material can be increased. Thus, in the absence of the potassium the amount of combined chlorine should not be more than about 0.20% by weight of the zinc sulphide. The increased tolerance towards the presence of combined chlorine is especially useful, since it is often difficult to obtain zinc sulphide with the low proportion of combined chlorine that is otherwise required. I have further found that more consistent results are obtained, e. g. from batch to batch of the material, when potassium is present.

The potassium may be added to the intimate mixture from which the material is made in the form of one of its compounds other than one comprising combined halogen, for example, as the sulphate, nitrate, hydroxide or oxalate, and preferably as the carbonate or bicarbonate.

The addition of a small amount of zinc oxide to the intimate mixture before heating is found to be beneficial e. g. in that the electroluminescent brightness of the final material is increased.

The temperature at which the intimate mixture is heated (and reheated if it is reheated) may be from 650 to 1050° C. and preferably is from 800 to 975° C. It is sometimes found that the brightness of the final material can be increased if the material resulting from the first heating is ground and reheated. During the heating and reheating the atmosphere to which the intimate mixture and the heated material respectively are subjected should not be such that the zinc sulphide undergoes excessive oxidation e. g. the heating and reheating may be carried out in a closed crucible or with an atmosphere of nitrogen. Atmospheres which tend to reduce the lead or copper compounds should not be used. Subsequent to the heating (or the reheating if the material is reheated) the resulting material should be freed from zinc oxide e. g. by washing the material with boiling, dilute (about 20%) acetic acid, rinsing with distilled water and drying.

A method of preparing an electroluminescent material in accordance with the invention will now be described, by way of example. The starting materials used in the preparation of the intimate mixture should be of the high degree of purity recognised in the art as necessary.

50 gms. of zinc sulphide (containing 0.4% by weight of combined chlorine), 1.65 gm. of zinc oxide, 0.60 gm. of lead carbonate, 1.0 gm. of potassium carbonate and 1.25 ml. of copper sulphate solution (containing 0.028 gm. of $CuSO_4.5H_2O$ per ml.) are intimately mixed together into a paste with distilled water and then dried at 160° C. for two hours. The resulting mixture is ground and then heated for one hour at 900° C. in a closed crucible.

The material resulting from the single heating operation can comprise the final material, or it can be ground and reheated to give the final material. When cool the final material is crushed and washed with boiling, dilute (about 20%) acetic acid until the washings are free from dissolved zinc. The washed material is then rinsed with distilled water, dried and sieved. The sieved material is suspended in castor oil, or otherwise embedded in some other light transmitting dielectric medium of high insulation resistance and high dielectric constant. A layer of the material embedded in the dielectric is then formed between a pair of spaced conductive electrodes constituted by an electrically-conductive plate and a piece of glass having a light transmitting electrically-conductive coating on the face nearest to the material/dielectric layer. The thickness of the material/dielectric layer may be between about 0.001 to about 0.010 inch and its effective area, when required for test purposes, may be about five square inches.

Upon application of about 500 volts at 50 C. P. S. between the two electrodes to produce an exciting field, the material exhibits an electroluminescence of a strong, deep blue colour.

I claim:

1. An artificial electroluminescent material consisting essentially of zinc sulphide activated by copper and lead, the material including from 0.002 to 0.5% of combined chlorine, by weight of the zinc sulphide, and from 0.2 to 5% of combined potassium, by weight of the zinc sulphide.

2. An artificial electroluminescent material as claimed in claim 1 in which the amount of potassium present is about 1% by weight of the zinc sulphide.

3. An artificial electroluminescent material as claimed in claim 2 in which there is from 0.01 to 0.15% of copper by weight of the zinc sulphide.

4. An artificial electroluminescent material as claimed in claim 3 in which there is from 0.014 to 0.04% of copper, by weight of the zinc sulphide.

5. An artificial electroluminescent material as claimed in claim 4, in which there is from 0.02 to 2% of lead, by weight of the zinc sulphide.

6. An artificial electroluminescent material as claimed in claim 5 in which there is from 0.15 to 1.5% of lead, by weight of the zinc sulphide.

7. An electroluminescent lamp comprising a pair of spaced conductive electrodes and an electroluminescent material disposed between the electrodes to be traversed by an electric field produced between the electrodes, the material consisting essentially of zinc sulphide activated by copper and lead and including from 0.002 to 0.5% of combined chlorine, by weight of the zinc sulphide and from 0.2 to 5% of combined potassium by weight of the zinc sulphide.

8. An electroluminescent lamp as claimed in claim 7, wherein the electroluminescent material contains about 1% of potassium, by weight of the zinc sulphide.

9. An electroluminescent lamp as claimed in claim 8 wherein the electroluminescent material contains from 0.01 to 0.15% of copper, by weight of the zinc sulphide.

10. An electroluminescent lamp as claimed in claim 9 wherein the electroluminescent material contains 0.014–1.04% of copper, by weight of the zinc sulphide.

11. An electroluminescent lamp as claimed in claim 10 wherein the electroluminescent material contains 0.02 to 2% of lead, by weight of the zinc sulphide.

12. An electroluminescent lamp as claimed in claim 11, wherein the electroluminescent material contains 0.15 to 1.5% of lead by weight of the zinc sulphide.

References Cited in the file of this patent

UNITED STATES PATENTS 2,566,349   Mager _____ Sept. 4, 1951

OTHER REFERENCES

Kroger: Jour. Opt. Soc. America, vol. 39, No. 8, August 1949, pages 670–672.

Homer: J. Electrochem. Soc., December 1953, vol. 100, No. 12, pages 566–571.